(12) United States Patent
Matsuoka

(10) Patent No.: US 6,820,926 B2
(45) Date of Patent: Nov. 23, 2004

(54) VEHICLE BODY REINFORCEMENT STRUCTURE

(75) Inventor: Ryosuke Matsuoka, Redondo Beach, CA (US)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/336,750

(22) Filed: Jan. 6, 2003

(65) Prior Publication Data

US 2004/0130184 A1 Jul. 8, 2004

(51) Int. Cl.$^7$ .............................. B62D 27/02; B60N 2/46
(52) U.S. Cl. ............................ 296/203.01; 296/187.09; 296/37.8; 296/1.09
(58) Field of Search ........................ 296/187.01, 187.09, 296/181.4, 205, 203.01, 37.8, 1.09, 186, 188, 189; 180/315

(56) References Cited

U.S. PATENT DOCUMENTS 2,007,134 A * 7/1935 Rosenberg .................. 180/292
5,127,704 A 7/1992 Komatsu

* cited by examiner

*Primary Examiner*—Dennis H. Pedder
(74) *Attorney, Agent, or Firm*—Birch, Stewart, Kolasch & Birch, LLP

(57) ABSTRACT

A vehicle body reinforcement structure has a reinforcing member positioned at a predetermined height from a floor panel such that the reinforcing member may function as an armrest. The reinforcing member extends substantially at the center of a vehicle compartment in the longitudinal direction of a vehicle. This structure allows the reinforcing member to be disposed in the space of the vehicle compartment without causing an occupant to sense discomfort, and improves stiffness of the vehicle body.

12 Claims, 7 Drawing Sheets

VEHICLE BODY REINFORCEMENT STRUCTURE

BACKGROUND OF THE INVENTION (1) Field of the Invention

The present invention relates to a vehicle body reinforcement structure.

(2) Description of the Related Art

Conventionally, a vehicle body reinforcement structure disclosed in U.S. Pat. No. 5,127,704, for example, has been known.

This conventional vehicle body reinforcement structure includes a dash lower cross member provided at an engine room side of a dashboard lower panel and extends in the lateral direction of a vehicle. The dash lower cross member also has a tunnel reinforcement that extends from an intermediate portion thereof along an upper surface of a tunnel part of a floor panel in a longitudinal direction of the vehicle. A rear-most end of the tunnel reinforcement is connected to a cross member mounted on an upper surface of the floor panel and extends in the lateral direction of the vehicle. This structure is intended to increase the stiffness of the tunnel part of the floor panel and to absorb a load applied by a frontal impact against the vehicle.

In the above-described conventional structure, however, the stiffness of the vehicle body is enhanced only at a certain portion of the vehicle body, i.e. the floor panel.

SUMMARY OF THE INVENTION

It is therefore an object of the present invention to provide a vehicle body reinforcement structure that may increase the vehicle body stiffness.

To attain the above object, the present invention provides a vehicle body reinforcement structure comprising: a vehicle body front member provided in a front part of a vehicle; a vehicle body rear member provided in a rear part of the vehicle; and a reinforcing member that extends between the vehicle body front member and the vehicle body rear member in a longitudinal direction of the vehicle, at least a portion of the reinforcing member being totally spaced apart from a floor panel such that said reinforcing member does not make contact with the floor panel.

BRIEF DESCRIPTION OF DRAWINGS

The nature of this invention, as well as other subjects and advantages thereof, will be explained in the following with the reference to the accompanying drawings, in which like reference characters designate the same or similar parts throughout the figures and wherein.

DETAILED DESCRIPTION OF THE INVENTION

An embodiment of the present invention will now be described in detail with reference to the drawings.

Figure 1:
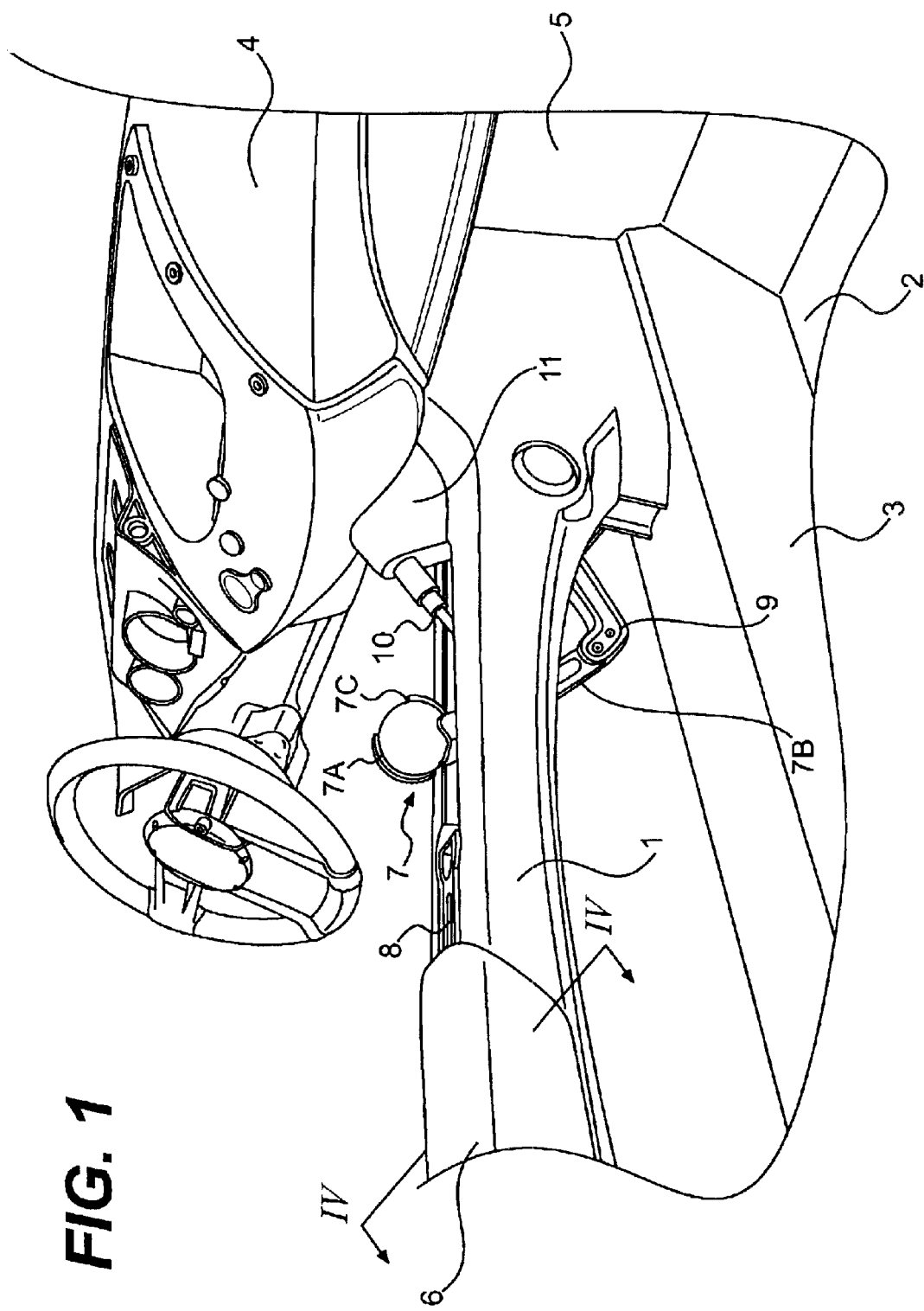
FIG. 1 is a perspective view showing a front part of a vehicle compartment interior including a reinforcing member according to an embodiment of the present invention.

FIG. 1 shows a reinforcing member 1 interposed between a driver seat and a passenger seat, neither of which is illustrated, that extends in a longitudinal direction of a vehicle. A front end of the reinforcing member 1 is attached to vehicle body front members, i.e. an upper surface of a convex tunnel part 3 formed on a floor panel 2, a lower surface of an instrument panel 4, and a dashboard panel 5 that divides an engine room and a vehicle compartment.

Figure 4:
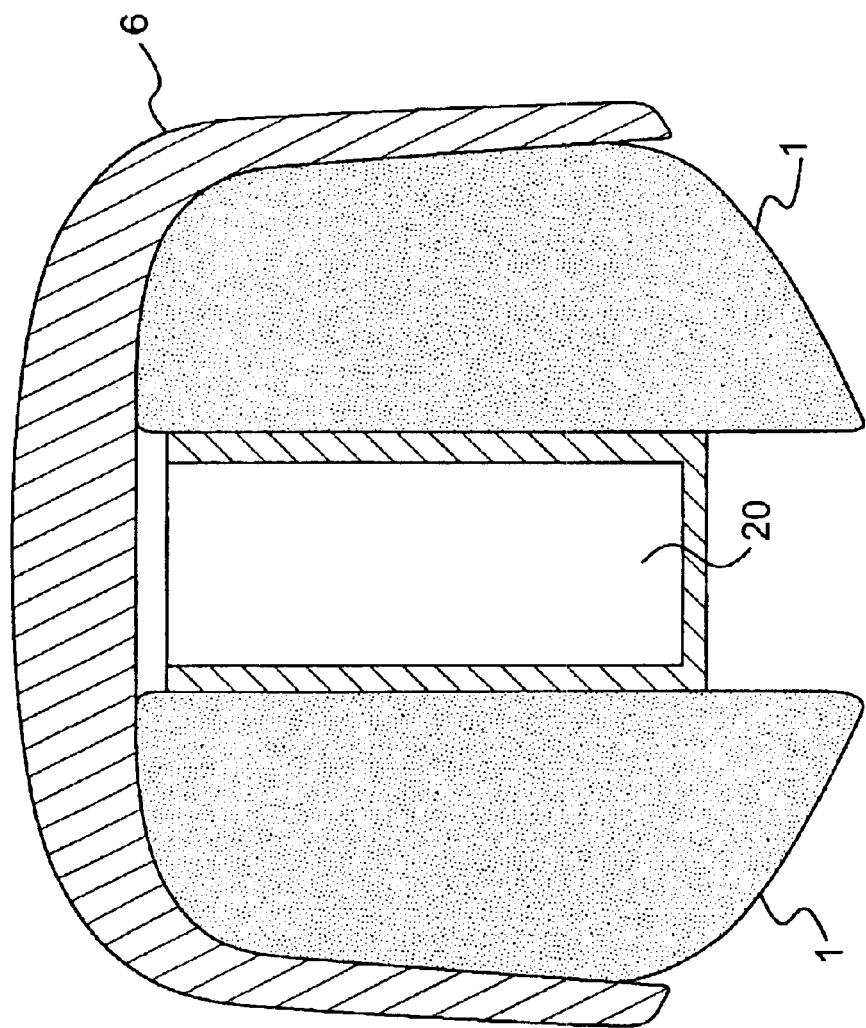
FIG. 4 is a view taken along line IV–IV of FIG. 1.

The reinforcing member 1 also functions as an armrest for the driver seat or the passenger seat in order to give occupants some comfort. Accordingly, the reinforcing member 1 is disposed at a suitable height and spaced apart from the floor panel 2 so that the reinforcing member 1 can function as the armrest. More specifically, at least a portion of the reinforcing member 1 adjacent to the driver and passenger seats is totally spaced apart from the floor panel 2 such that the reinforcing member 1 does not make contact with the floor panel. Further, a cushioning member 6 is provided at a position where the reinforcing member 1 can be used as the armrest such that the cushioning member 6 covers the reinforcing member 1 as shown in FIG. 4. The cushioning member 6 is also attached pivotally to the reinforcing member 1 such that the cushioning member 6 is capable of opening and closing a space mentioned later. A container box 20, capable of storing small items a the like, is formed in the space.

Further, as shown in FIG. 4, the reinforcing member 1 has such a bifurcated structure that, along a longitudinal direction thereof, the reinforcing member 1 is bifurcated into right and left portions, which extend substantially parallel with each other. Accordingly, a shift lever 7 of an automatic transmission can be adapted to pass through the space formed by the bifurcated structure of the reinforcing member 1.

Figure 2:
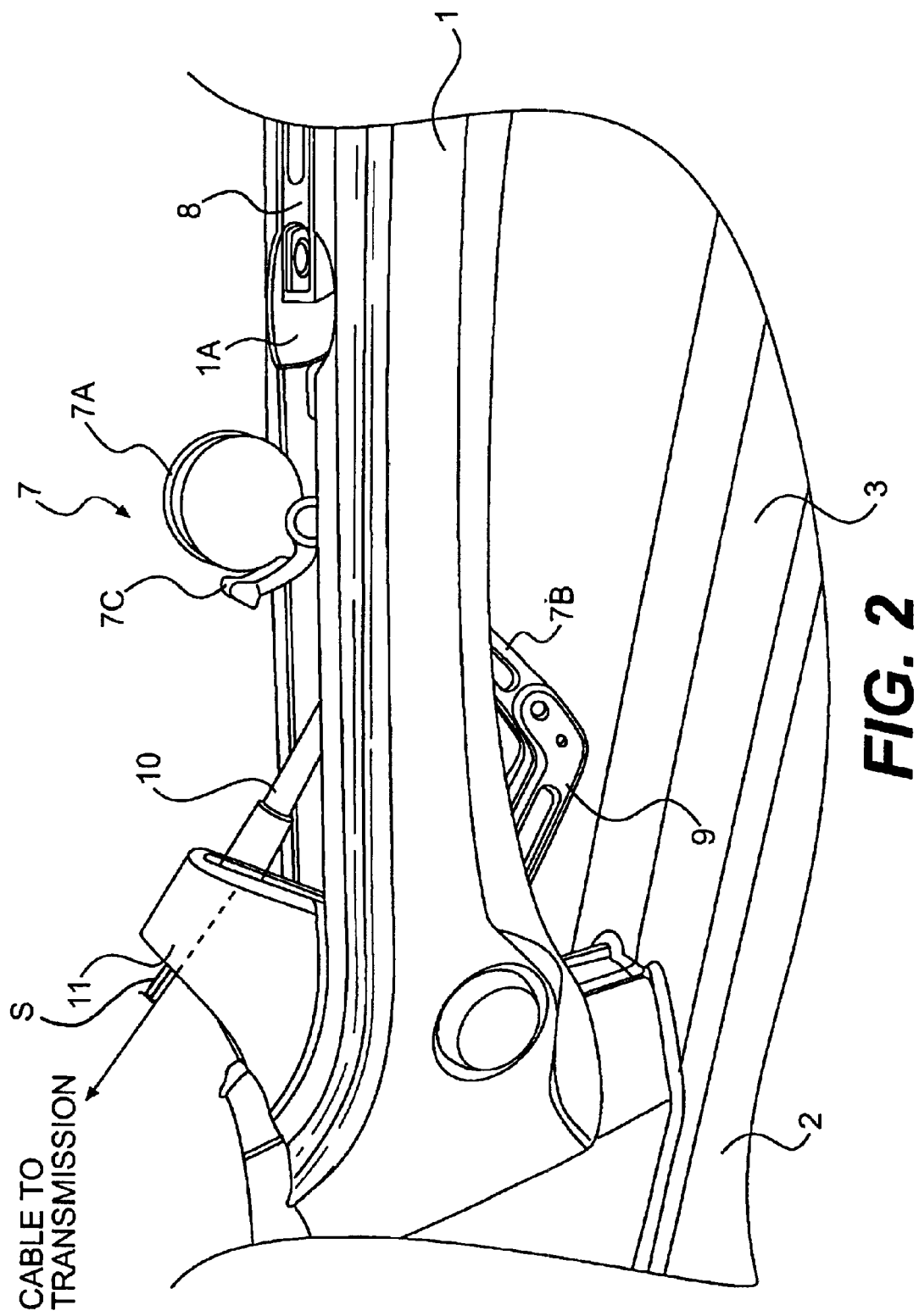
FIG. 2 is an enlarged view showing a front part of the reinforcing member.

As shown in FIG. 2, the shift lever 7 includes a shift knob 7A, an arm part 7B, and a shift switch 7C. The shift knob 7A is provided at one end of the arm art 7B and positioned above the reinforcing member 1. The other end of the arm part 7B passes through the space formed by the bifurcated structure of the reinforcing member 1 and is attached to a support member 9 fixed at the front art of the reinforcing member 1 such that the arm part 7B may pivot about the support member 9 in the longitudinal direct on of the vehicle. Further, one end of a push rod 10, which is connected to a shift cable S extending from an automatic transmission, not shown, is attached to a substantially middle portion of the arm part 7B. The other end of the push rod 10 is attached to a mounting part 11 provided between the reinforcing member 1 and the lower surface of the instrument panel 4 such that the push rod 10 may slide therethrough. The shift switch is pivotally attached to the arm part 7B and below the shift knob 7A. By moving the shift switch 7C, a lock member, not shown, which locks the shift lever 7 in predetermined positions can be released.

Figure 5:
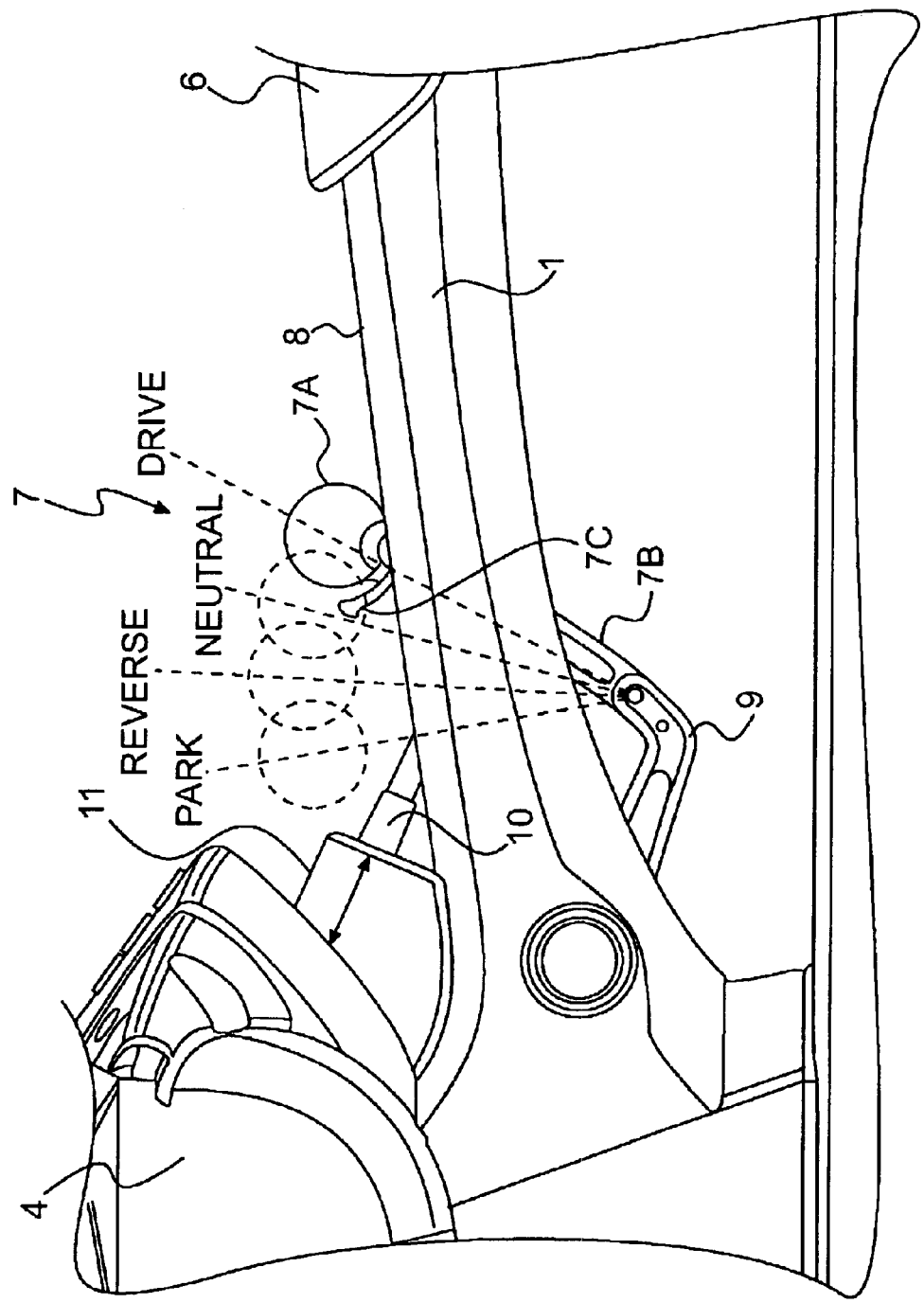
FIG. 5 is a view showing an operation of a shift lever.

The position of the shift lever 7 can be selected among a Parking position, a Reverse position, a Neutral position, and a Drive position, and so forth, by moving the shift switch 7C upward toward the shift knob 7A as shown in FIG. 5.

As shown in FIG. 2, at the upper side of the reinforcing member 1, a release lever 8 for releasing a foot-operated parking brake is provided pivotally behind the shift lever 7 such that the parking brake is released when the release lever 8 is turned upward. The release lever 8 passes through an internal space of the reinforcing member 1 and is joined to a brake cable connected to a brake lock mechanism, not shown. A concaved part 1A, which is sized to allow a fingertip to be inserted, is formed at an upper surface of the reinforcing member 1 and adjacent the release lever 8 so that the release lever 8 can be easily operated. With this arrangement, the parking brake can be released by inserting a fingertip into the concaved part 1A and turning the release lever 8 upward.

Figure 3:
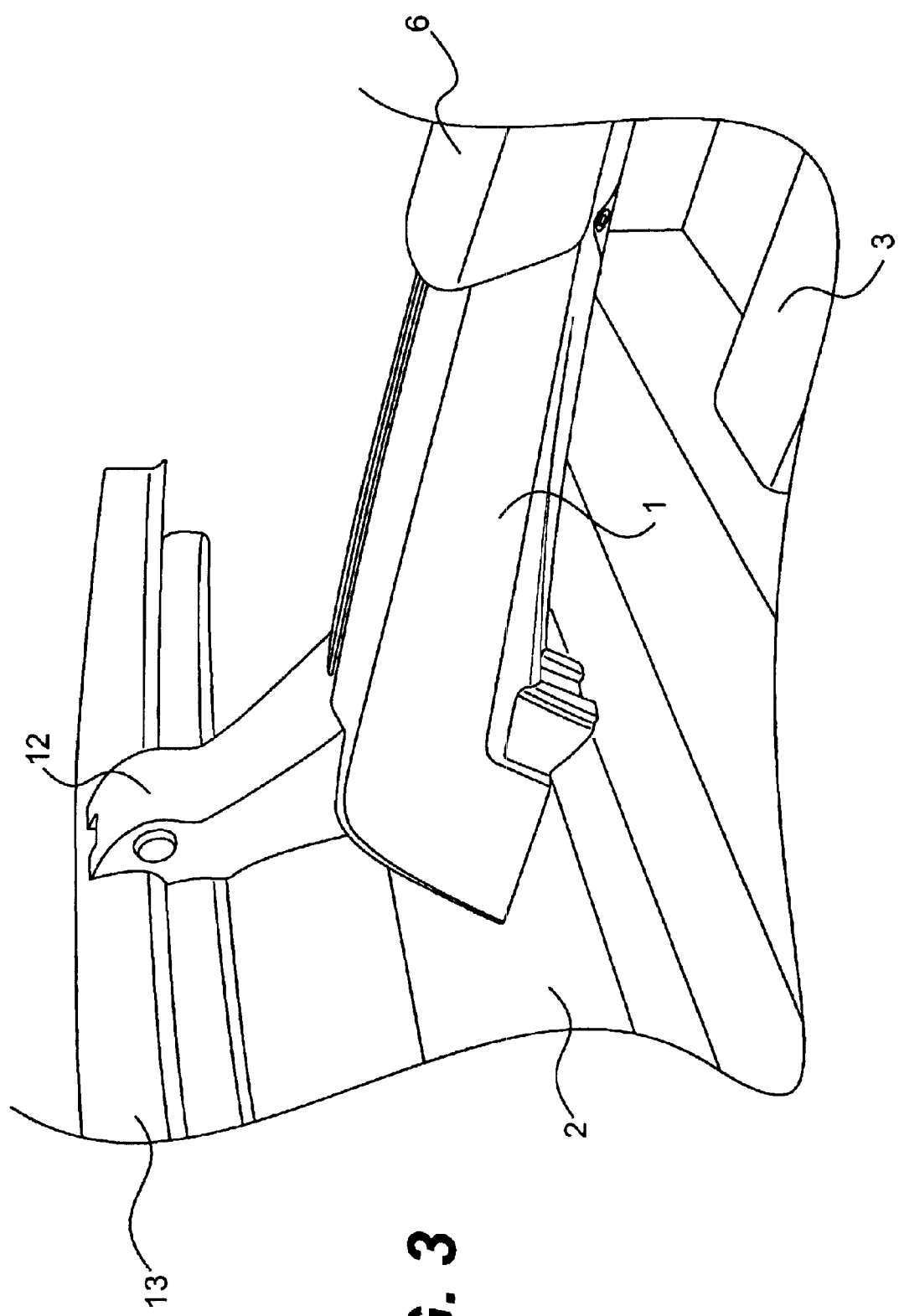
FIG. 3 is an enlarged view showing a rear part of the reinforcing member.

A description will now be given of a mounting structure of the reinforcing member 1 in the rear part of the vehicle. As shown in FIG. 3, the rear end of the reinforcing member 1 is bent downward and attached to the rear part of the floor panel 2, as a vehicle body rear member, that rises upward. The rear end of the reinforcing member 1 is also attached to a cross member 13, as a vehicle body rear member, via a fixing member 12. The fixing member 12 has one end thereof attached to the reinforcing member 1 and the other end thereof attached to the cross member 13. The cross member 13 extends in the lateral direction of vehicle and has both ends thereof joined to a rear side frame, not shown.

Figure 6:
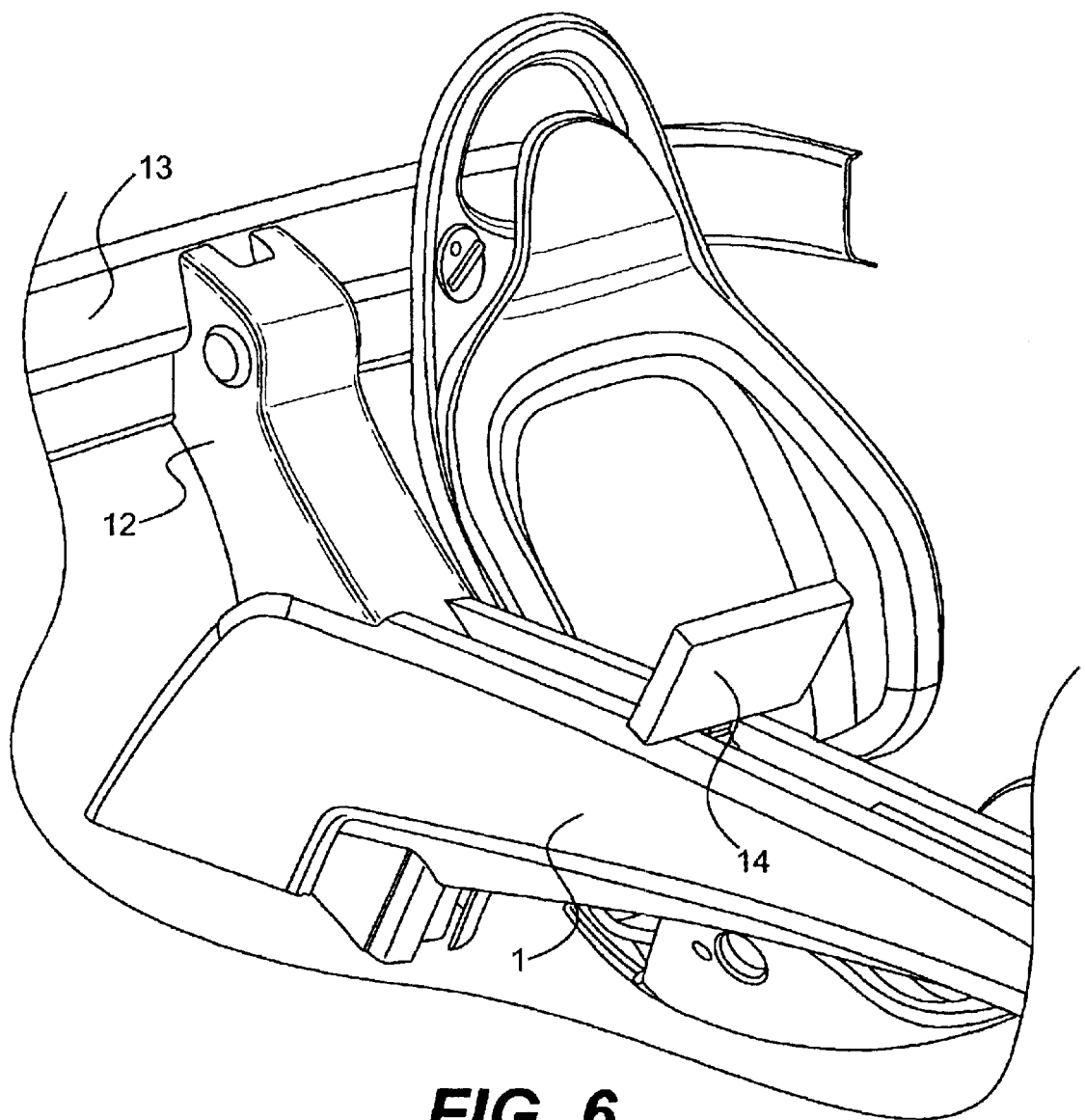
FIG. 6 is a view showing a state in which a rear video monitor is used.
Figure 7:
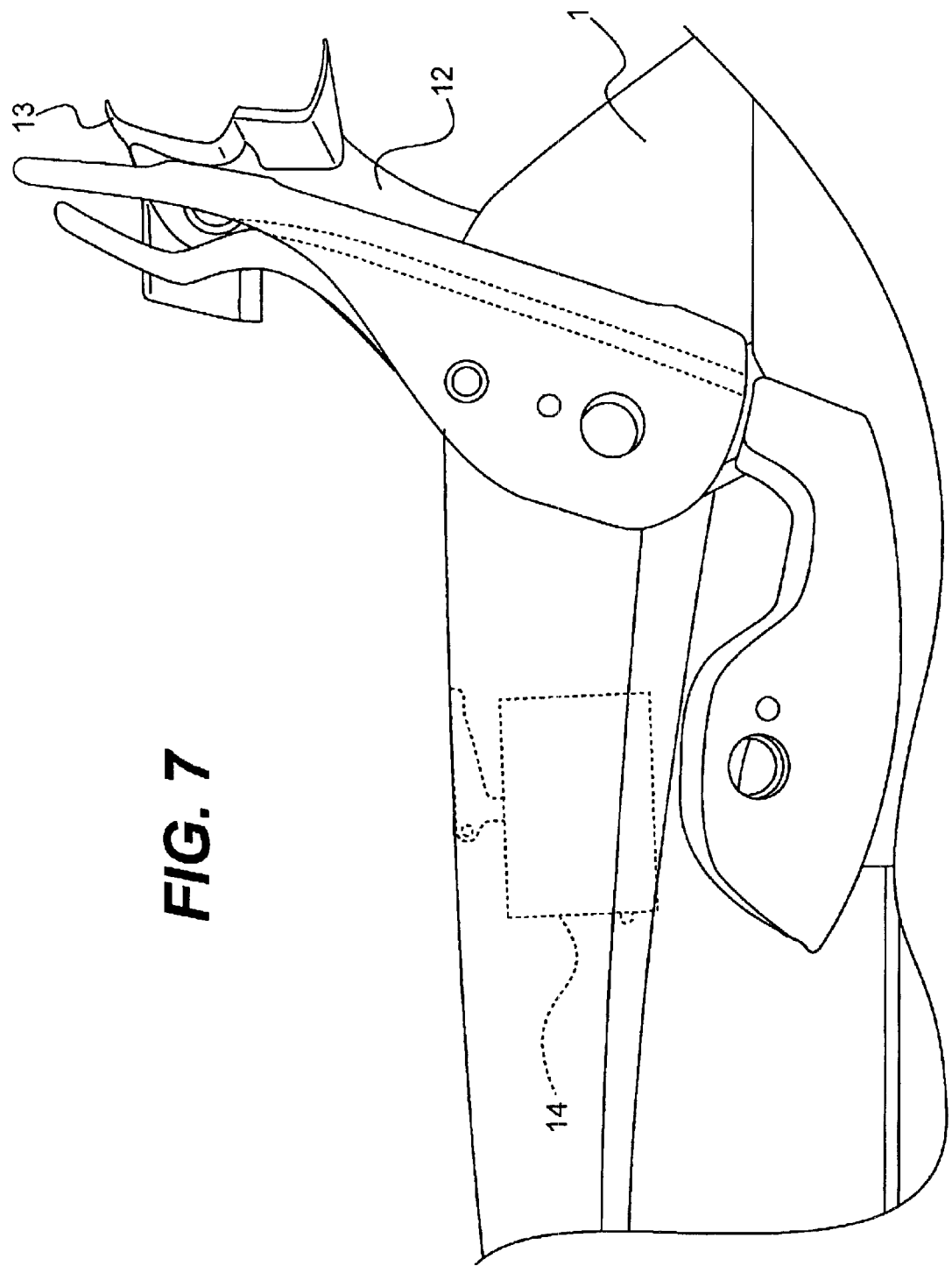
FIG. 7 is a view showing a state in which the rear video monitor is housed in the reinforcing member.

A rear monitor 14 is mounted on the rear portion of the reinforcing member 1 as shown in FIG. 6. The rear monitor 14 is attached to the reinforcing member 1 such that the rear monitor 14 may be housed in the space formed by the bifurcated structure of the reinforcing member 1 as shown in FIG. 7.

It is to be understood, however, that there is no intention to limit the invention to the above-described embodiment, but certain changes and modifications may be possible within the scope of the appended claims.

For example, although in the above-described embodiment, the front end of the reinforcing member 1 is attached to three vehicle body front members, i.e. the tunnel part 3, instrument panel 4, and dashboard panel 5, the present invention is not limited to this. The front end of the reinforcing member 1 may be attached only to one or two of the above three members.

Further, although in the above-described embodiment, the rear end of the reinforcing member 1 is attached to the floor panel 2 and the cross member 13 as the vehicle body rear members, the present invention is not limited to this. The rear end of the reinforcing member 1 may be attached to only one of the floor panel 2 and the cross member 13.

Further, although in the above-described embodiment, the floor panel 2 has the tunnel part 3, the present invention is not limited to this. The floor panel 2 may not have the tunnel part 3. In the case where the tunnel part 3 is not provided, a wide space can be ensured between the reinforcing member 1 and the floor panel 2 and the space can be used to place items therein, or the like.

What is claimed is:

1. A vehicle body reinforcement structure, comprising:
   a vehicle body front member provided in a front part of a vehicle;
   a vehicle body rear member provided in a rear part of the vehicle;
   a floor panel extending between said vehicle body front member and said vehicle body rear member; and
   a reinforcing member that has a front end thereof connected directly to said vehicle body front member and a rear end thereof connected to said vehicle body rear member, and a least an intermediate portion of said reinforcing member being spaced apart from the floor panel, said reinforcing member having a bifurcated structure that includes right and left portions extending parallel with respect to one another.

2. A vehicle body reinforcement structure according to claim 1, wherein said vehicle body front member includes at least one of a dashboard panel that divides an engine room and the vehicle compartment, an instrument panel to which gauges and the like are provided, and the floor panel.

3. A vehicle body reinforcement structure according to claim 1, wherein said vehicle body rear member includes at least one of a cross member provided in the rear part of the vehicle and extends in a lateral direction of the vehicle, and the floor panel.

4. A vehicle body reinforcement structure according to claim 3, wherein said vehicle body rear member is the cross member, and a rear part of said reinforcing member and said cross member are attached to each other via a fixing member extending substantially upward.

5. A vehicle body reinforcement structure according to claim 1, wherein said reinforcing member is positioned substantially at a center of the vehicle compartment and is disposed at a predetermined height from the floor panel such that said reinforcing member functions as an armrest.

6. A vehicle body reinforcement structure according to claim 5, further comprising:
   a cushioning member that covers said reinforcing member at a position where said reinforcing member functions as the armrest.

7. A vehicle body reinforcement structure according to claim 1, further comprising:
   a shift lever having a lever part that passes through a space formed by the bifurcated structure.

8. A vehicle body reinforcement structure, comprising:
   a vehicle body front member provided in a front part of a vehicle;
   a vehicle body rear member provided in a rear part of the vehicle;
   a floor panel extending between said vehicle body front member and said vehicle body rear member;
   a reinforcing member that has a front end thereof connected directly to said vehicle body front member and a rear end thereof connected to said vehicle body rear member, and at least an intermediate portion of said reinforcing member being spaced apart from the floor panel, said reinforcing member having a bifurcated structure that includes right and left portions extending substantially in parallel with each other;
   a shift lever having a lever part that passes through a space formed by the bifurcated structure;
   a support member provided on said vehicle body front member that pivotally supports a lower end of said lever part; and
   a push rod provided on said vehicle body front member, a substantially middle portion of said lever part being attached to said push rod, said push rod being connected to a shift cable for an automatic transmission.

9. A vehicle body reinforcement structure, comprising:
   a vehicle body front member provided in a front part of a vehicle;
   a vehicle body rear member provided in a rear part of the vehicle;
   a floor panel extending between said vehicle body front member and said vehicle body rear member;
   a reinforcing member that has a front end thereof connected directly to said vehicle body front member and a rear end thereof connected to said vehicle body rear member, and at least an intermediate portion of said reinforcing member being spaced apart from the floor panel, said reinforcing member having a bifurcated structure that includes right and left portions extending substantially in parallel with each other; and a monitor mounted on said reinforcing member such that said monitor is housed in a space formed by the bifurcated structure.

10. A vehicle body reinforcement structure, comprising:

a vehicle body front member provided in a front part of a vehicle;

a vehicle body rear member provided in a rear part of the vehicle;

a floor panel extending between said vehicle body front member and said vehicle body rear member;

a reinforcing member that has a front end thereof connected directly to said vehicle body front member and a rear end thereof connected to said vehicle body rear member, and at least an intermediate portion of said reinforcing member being spaced apart from the floor panel, said reinforcing member having a bifurcated structure that includes right and left portions extending substantially in parallel with each other; and a container box mounted on said reinforcing member such that said container box is housed in a space formed by the bifurcated structure.

11. A vehicle body reinforcement structure according to claim 10, further comprising:

a cushioning member that covers said reinforcing member at a position where said reinforcing member functions as an armrest, wherein said container box is provided under said cushioning member.

12. A vehicle body reinforcement structure according to claim 1, wherein a whole portion of said reinforcing member except for both ends thereof is spaced apart from said floor panel.

* * * * *